United States Patent [19]

Koller

[11] 4,274,957
[45] Jun. 23, 1981

[54] SKIMMER HAVING A WIDE DRIVE ROLLER, A GUIDE MEANS, AND A TENSION MEANS

[76] Inventor: Joseph A. Koller, 1900 Old Willow Rd., Northfield, Ill. 60093

[21] Appl. No.: 775,195

[22] Filed: Mar. 7, 1977

[51] Int. Cl.³ ............... B01D 57/00; B01D 43/00
[52] U.S. Cl. ............................. 210/172; 210/241; 210/244; 210/400; 210/526
[58] Field of Search ............ 210/242 S, 396, 400–402, 210/526, DIG. 25, DIG. 26, 172, 244, 241

[56] References Cited

U.S. PATENT DOCUMENTS

| | | | |
|---|---|---|---|
| 3,578,585 | 5/1971 | Yahnke | 210/402 |
| 3,617,552 | 11/1971 | Will et al. | 210/DIG. 26 P |
| 3,915,865 | 10/1975 | Haji et al. | 210/396 |

FOREIGN PATENT DOCUMENTS 735254 5/1966 Canada ..................... 210/DIG. 25

Primary Examiner—Frank A. Spear, Jr.
Attorney, Agent, or Firm—Edmond T. Patnaude

[57] ABSTRACT

A portable, self contained skimmer utilizes an endless flexible belt which depends into the liquid to be skimmed and is driven between two rollers for removal of liquid from the belt.

9 Claims, 3 Drawing Figures

SKIMMER HAVING A WIDE DRIVE ROLLER, A GUIDE MEANS, AND A TENSION MEANS

The present invention relates in general to the art of separating a surface liquid from another liquid on which it is floating, and it relates in particular to a new and improved skimming apparatus which employs a continuous, flexible belt having at least the outer surface preferentially wettable by one of the liquids.

BACKGROUND OF THE INVENTION

While the present invention has many and varied uses in separating mutually immiscible liquids, it is described herein in connection with the removal of oil from the surface of a body of water. However, the invention is not so limited and the appended claims should not be so construed.

Although skimming devices have been widely known and used for many years, with the growing need for better control and removal of liquid pollutants from streams, rivers and other water bodies, it has become increasingly important to provide less costly oil skimmers so as to enable a greater and more widespread use of such equipment.

The prior art skimming devices have in general utilized a motor driven member such as a drum, a disc or a belt which adsorbs a floating liquid such as oil and transports it to a collection area. The prior art devices have been designed to be highly efficient and as a consequence have been relatively complex and expensive to manufacture. Such devices have not, therefore, found application where only relatively small quantities of oil are to be collected. For example, one application where present day oil skimmers are uneconomical is in machine shops wherein acqueous cooling liquids are contaminated by oil and should not, therefore, be discarded into a sewer. In such applications the time required to separate the oil from the liquid on which it is floating is not an important factor inasmuch as the separation need only be carried out on intermittent batch bases.

OBJECTS OF THE INVENTION

A principle object of the present inventions is, therefore, to provide a new and improved inexpensive device for separating one liquid from another liquid on which it is floating.

Another object of the present invention is to provide a new and improved oil skimmer which may be mounted, for example, on conventional drums for separating oil from other liquids contained in the drums.

SUMMARY OF THE INVENTION

Briefly, the above and further objects may be realized in accordance with the present invention by providing an endless, flexible belt formed of a material having at least the outer surface preferentially wettable by the liquid to be removed, and drive means in the form of a roller over which the belt is passed for driving the belt through the liquid and up over the drive roller. A second roller is biased downwardly toward the downwardly traveling surface of the first roller so as to press against the belt and remove oil from the upper surface thereof as it travels between the rollers. Because the second roller is offset from the drive roller an open ended trough is provided at the nip between the second roller and the upper surface of the belt and the oil thus removed from the upper surface of the belt accumulates in this trough from which it travels in both directions onto the side surfaces of the drive roller. The oil then drips from the side surfaces of the drive roller into a channel or other collector located directly below and parallel with the longitudinal center line of the drive roller.

In a preferred embodiment of the invention an idler roller rests on the bottom of the belt within the liquid to maintain tension on the belt and to insure that the belt travels in a substantially vertical direction as it moves out of the liquid and up over the drive roller.

GENERAL DESCRIPTION OF THE DRAWINGS

Further objects and advantages and a better understanding of the present invention can be had by reference to the following detailed description, wherein.

DETAILED DESCRIPTION OF THE INVENTION

Figure 1:
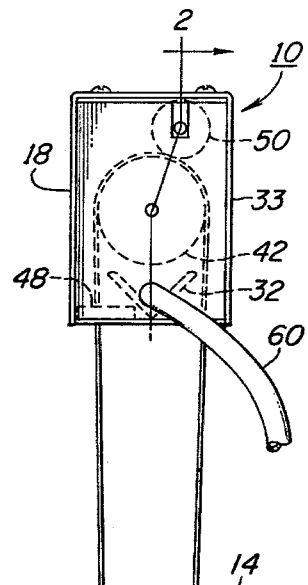
FIG. 1 is a side view of a liquid separator and collector embodying the present invention.
Figure 2:
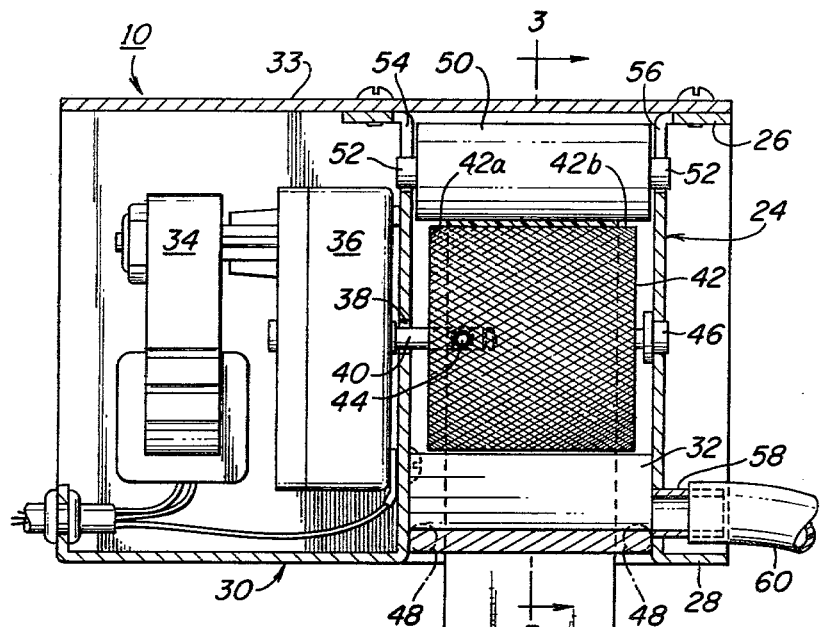
FIG. 2 is a sectional view of the separator of FIG. 1 taken along the line 2—2 thereof.
Figure 3:
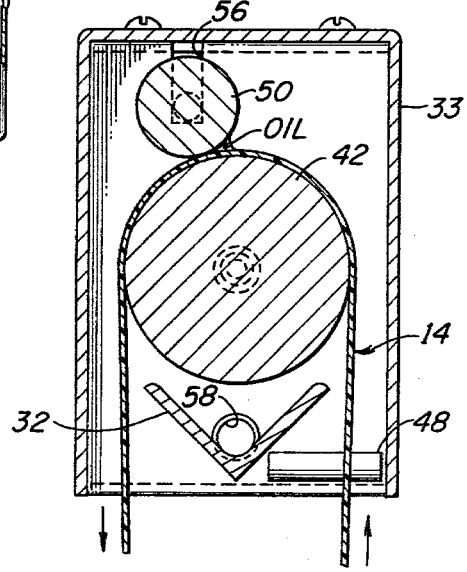
FIG. 3 is a sectional view taken along the line 3—3 of FIG. 2.

Referring now to the drawing and particularly to FIGS. 1-3, a skimming device 10 is mounted above a body of liquid 12 having a surface liquid 12a such as oil floating on another liquid 12b such as water. The skimming device incorporates an endless flexible belt 14 having an outer surface 14a which is preferentially wetted by the floating liquid. A belt formed of a neoprene fabric having a matt finish such as is commonly used in conveyors has been found to perform satisfactorily. As more fully described hereinafter the belt is driven in the direction of the arrows as shown in FIG. 1, and an idler roller 16 rests in the bottom loop of the belt within the body of liquid. The roller 16 has end flanges 16a and 16b which maintain the roller on the belt. The roller 16 may be formed of metal or other material which sinks in the liquid, and it functions to maintain the belt under tension as well as to locate it directly under a belt drive and liquid collector unit 18.

Figure 4:
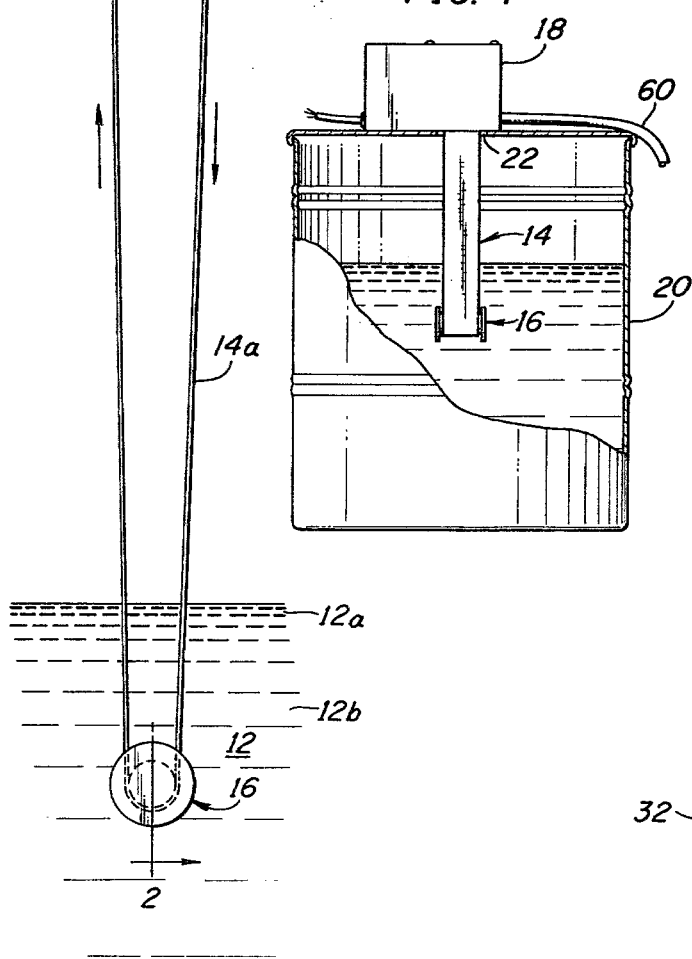

For use in machine shops, for example, the liquid to be skimmed may be placed in a drum 20 as shown in FIG. 4 and the unit 18 mounted to the top of the drum over a hole 22 cut therein. In such a case the hole may be a square having sides somewhat longer than the width of the belt 14.

The drive and collector unit 18 comprises a frame formed by an end plate 24 having top and bottom flanges 26 and 28 and an L-shaped member 30 fixedly connected to the plate 24 by a channel member 32. The ends of the member are preferably welded to the members 24 and 30 to provide a unitary rigid frame. A U-shaped cover 33 is removably mounted to the frame by suitable screws. An electric drive motor 34 and an adjustable speed reduction drive 36 are mounted to the frame member 30 with the output drive shaft 40 of the gear reducer extending through a hole 38 in the upright portion of the frame member 30. A drive roller 42 is fitted onto the shaft 40 and locked thereto by a set screw 44. A stub shaft at the outer end of the roller 42 is journaled in a bearing 46 mounted in alignment with the shaft 40 in the end plate 24. The surface of the roller 42 may be knurled to provide better traction between the roller and the belt if desired.

As shown in FIG. 2 the roller 42 has a length which is greater than the width of the belt 14 and a pair of guide rods 48 are respectively welded to the frame members 24 and 30 to center the belt on the roller 42. Uncovered edge portions of the drive roller are thus provided and these are identified at 42a and 42b.

In order to remove liquid from the outer surface of the belt as it passes through the unit 18, a deflection roller 50 having mutually aligned stub shafts 52 is biased against the drive roller 42 on the downwardly traveling side thereof. In the illustrated embodiment of the invention the axis of the roller 50 is offset about ten degrees from the axis of the roller 42. When using a solid metal deflection roller 50 the weight of the roller exerts a sufficient biasing force to prevent the liquid on the belt surface from passing under the roller. As shown, the shafts 52 rest at the bottoms of vertical slots 54 and 56 in the frame members 24 and 30 whereby the deflection roller is free to lift up should chips of metal or other foreign matter be carried out of the liquid body on the belt.

Inasmuch as the deflection roller 50 is urged toward the downwardly traveling surface of the roller 42, a trough is formed at the nip of the rollers, and the removed liquid initially collects in this trough, as shown in FIG. 3. Hence it does not flow back down the belt into the body of liquid. Inasmuch as the belt width is less than the roller length the liquid from this trough flows onto the side or end portions 42a and 42b of the drive roller where it accumulates and drips from the bottommost portions thereof into the channel 32. A drain pipe 58 extends through the frame plate 24 and opens onto the bottom of the channel 32. A hose 60 fitted onto the pipe 58 thus carries the collected liquid to a suitable receptacle (not shown).

In a successful reduction to practice of the invention wherein oil was skimmed from a body of water, the belt had a width of two inches and the drive roller had a length of two and one-half inches. The drive roller was driven at a speed of twelve r.p.m. It should be understood, however, that the optimum speed at which the belt travels is a function of the viscosity of the liquid to be removed and the height of the unit 18 above the liquid. The speed must be at least great enough to carry the removed liquid to the drive roller before it can run back down the belt, but it must not be so great as to carry the other liquid up into the unit 18.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Skimming apparatus for removing a first liquid from a second liquid on which it is floating, comprising
    a drive roller mounted for rotation about a substantially horizontal axis,
    an endless belt having an outer surface preferentially wettable by said first liquid,
    said belt extending over said roller and depending into said first liquid.
    the width of said drive roller being greater than the width of said belt,
    drive means for rotating said roller to drive said belt upwardly over said roller and downwardly into said liquid,
    a second roller mounted above and in parallel relationship with said drive roller,
    said second roller being urged downwardly against said belt toward the downwardly traveling surface of the upper portion of said drive roller to squeeze said first liquid from said belt and to provide a trough in which said first liquid squeezed from the surface of said belt is retained,
    means for guiding said belt away from the edges of said drive roller to provide exposed end portions of said roller, whereby liquid may flow from said trough onto said exposed end portions of said roller, and
    collector means mounted below said drive roller for collecting said first liquid which flows out of said trough onto said exposed end portions of said drive roller.

2. Skimming apparatus according to claim 1 wherein said collector means comprises
    a channel extending substantially parallel to the axis of rotation of said drive roller.

3. Skimming apparatus according to claim 2 comprising first and second spaced apart housing plates,
    said rollers being located between and journaled in said plates, and
    said channel being an open top channel member having its respective ends secured to said plates.

4. Skimming apparatus according to claim 3 comprising
    a passageway through one of said plates communicating with said channel for discharging said first liquid.

5. Skimming apparatus according to claim 3 wherein said means for guiding comprises
    first and second edge guides respectively carried by said plates below said drive roller.

6. Skimming apparatus according to claim 3 wherein said drive means comprises an electric motor and speed reduction transmission.

7. Skimming apparatus according to claim 6 comprising means for adjusting the speed of said drive roller.

8. Skimming apparatus according to claim 1 comprising
    an idler roller loosely resting on the bottom of said belt and solely supported by said belt to maintain said belt under tension,
    said idler roller having a specific gravity substantially greater than that of said second liquid so as to sink therein.

9. Skimming apparatus according to claim 8 wherein said roller comprises
    a cylindrical body section having a length greater than the width of said belt, and
    first and second end flanges on said body section for retaining said roller on said belt.

* * * * *